(12) United States Patent
Ko

(10) Patent No.: US 9,217,668 B2
(45) Date of Patent: Dec. 22, 2015

(54) MINIATURIZED OPTICAL SPECTROMETER AND FABRICATING METHOD THEREOF

(75) Inventor: Cheng-Hao Ko, Hsinchu County (TW)

(73) Assignee: OtO Photonics, Inc. (TW)

(*) Notice: Subject to any disclaimer, the term of this patent is extended or adjusted under 35 U.S.C. 154(b) by 467 days.

(21) Appl. No.: 13/642,312

(22) PCT Filed: Apr. 28, 2010
(Under 37 CFR 1.47)

(86) PCT No.: PCT/CN2010/072278
§ 371 (c)(1),
(2), (4) Date: Oct. 19, 2012

(87) PCT Pub. No.: WO2011/134145
PCT Pub. Date: Nov. 3, 2011

(65) Prior Publication Data
US 2013/0308128 A1 Nov. 21, 2013

(51) Int. Cl.
*G01B 11/02* (2006.01)
*G01J 3/02* (2006.01)

(52) U.S. Cl.
CPC .......... *G01J 3/0256* (2013.01); *G01J 3/02* (2013.01); *G01J 3/0259* (2013.01); *Y10T 29/49826* (2015.01)

(58) Field of Classification Search
CPC ........ G01J 3/0259; G01J 3/0256; H01P 1/042
See application file for complete search history.

(56) References Cited

U.S. PATENT DOCUMENTS

| | | | | |
|---|---|---|---|---|
| 6,226,083 B1* | 5/2001 | Schwerzel et al. | | 356/305 |
| 6,455,842 B1* | 9/2002 | Pouteau et al. | | 250/227.18 |
| 6,628,338 B1* | 9/2003 | Elberbaum et al. | | 348/373 |
| 7,400,499 B2* | 7/2008 | Mundt et al. | | 361/679.55 |
| 7,426,029 B2* | 9/2008 | Mauzy et al. | | 356/328 |
| 2004/0025993 A1* | 2/2004 | Russell | | 150/154 |
| 2004/0196458 A1* | 10/2004 | Shimizu et al. | | 356/328 |
| 2004/0239931 A1* | 12/2004 | Teichmann et al. | | 356/328 |
| 2008/0173781 A1* | 7/2008 | Muyskens | | 248/346.01 |
| 2008/0212074 A1* | 9/2008 | Goulter et al. | | 356/51 |
| 2008/0225392 A1* | 9/2008 | Ko | | 359/570 |
| 2009/0032024 A1* | 2/2009 | Burz et al. | | 128/206.24 |

* cited by examiner

*Primary Examiner* — Gregory J Toatley
*Assistant Examiner* — Maurice Smith
(74) *Attorney, Agent, or Firm* — Han IP Corporation; Andy M. Han

(57) ABSTRACT

A miniature spectrometer comprises an input unit, an image capture unit, a miniature diffraction optical grating, an optical grating accommodation slot, a cushion, and an affixing plate. The miniature spectrometer may further comprise a waveguide device, and the optical grating accommodation slot is positioned in a space defined by an opening of the waveguide device. The input unit receives an optical signal which proceeds in the waveguide device. The miniature diffraction optical grating separates the optical signal into numerous spectral components to be projected onto the image capture unit. The cushion is stacked on the miniature diffraction optical grating, with both disposed in the optical grating accommodation slot. The affixing plate is disposed on the waveguide device to apply a compressing force on the cushion to affix the miniature diffraction optical grating in the optical grating accommodation slot.

20 Claims, 5 Drawing Sheets

MINIATURIZED OPTICAL SPECTROMETER AND FABRICATING METHOD THEREOF

CROSS-REFERENCE TO RELATED APPLICATION

This application is the national phase application of international application number PCT/CN2010/072278, filed on Apr. 28, 2010, which is incorporated by reference in its entirety.

TECHNICAL FIELD

The present invention relates to an optical device, and more particularly relates to a miniature spectrometer.

BACKGROUND

Spectrometers are a type of non-destructive detection instruments, and are typically used in applications of identification of composition and characteristics of substances. A beam of light is projected onto a substance and, due to the principle of reflection of light and the reflection, absorption or penetration of light by the substance's compositional structure of different wavelengths, a spectrometer shows corresponding spectrum after receiving the reflected light from the substance. As different substances show different characteristics of the spectrum, the composition and characteristics of a substance can thus be identified.

To achieve the aforementioned effect, the positioning of various components of the spectrometer needs to be precise. If any component is shifted, rotated or damaged, performance of the spectrometer would be affected. Therefore, a goal of the industry is to provide a technique to precisely and rapidly dispose the various components of a spectrometer at respective positions.

SUMMARY

An objective of the present invention is to provide a miniature spectrometer. Adjustment, movement and affixation of the grating of the spectrometer are simpler and more convenient, without undermining the grating. This achieves the precise and firm positioning of the grating of the spectrometer.

A so-called miniature spectrometer is a miniaturized spectrometer having a grating that is a miniature diffraction grating. The miniature diffraction grating is generally fabricated by micro-electro-mechanical system (MEMS), semiconductor fabrication process, lithography, electroplating and molding (Lighographie GaVanoformung Abformung, LIGA) or other manufacturing processes. The height of the miniature diffraction grating is typically in a range from approximately tens of microns to hundreds of microns. As the thickness of the miniature diffraction grating is limited, and as the materials used in fabricating the miniature diffraction grating are usually brittle, the assembly and positioning of the miniature diffraction grating are not easy.

According to one aspect of the present invention, a miniature spectrometer may comprise an input unit, an image capture unit, a miniature diffraction grating, a grating accommodation slot, a cushion and an affixing plate. The input unit is configured to receive an optical signal. The miniature diffraction grating is configured to separate the optical signal into a plurality of spectral components that are projected onto the image capture unit. The cushion is disposed above the miniature diffraction grating, and the cushion and the miniature diffraction grating are disposed in the grating accommodation slot. The affixing plate applies a compressive force on the cushion to affix the miniature diffraction grating in the grating accommodation slot.

According to another aspect of the present invention, a method of fabricating a miniature spectrometer may comprise: providing a waveguide device in which an optical signal is transmitted, wherein the waveguide device includes a grating accommodation slot; disposing an input unit at a starting point of a transmission path of the optical signal so that the input unit receives the optical signal; disposing an image capture unit at an end point of the transmission path of the optical signal; providing a miniature diffraction grating and a cushion with the cushion disposed above the miniature diffraction grating, wherein by moving the cushion the miniature diffraction grating is disposed in the grating accommodation slot such that the miniature diffraction grating is in the transmission path to separate the optical signal into a plurality of spectral components that are projected onto the image capture unit; and providing an affixing plate that is disposed on the waveguide device to cover the grating accommodation slot, the affixing plate compressing on the cushion such that the miniature diffraction grating is affixed in the grating accommodation slot.

Detailed description of select embodiments of the present invention is provided below with reference to the attached figures to aid better understanding of the present invention.

NUMERICAL REFERENCES

Figure 1:
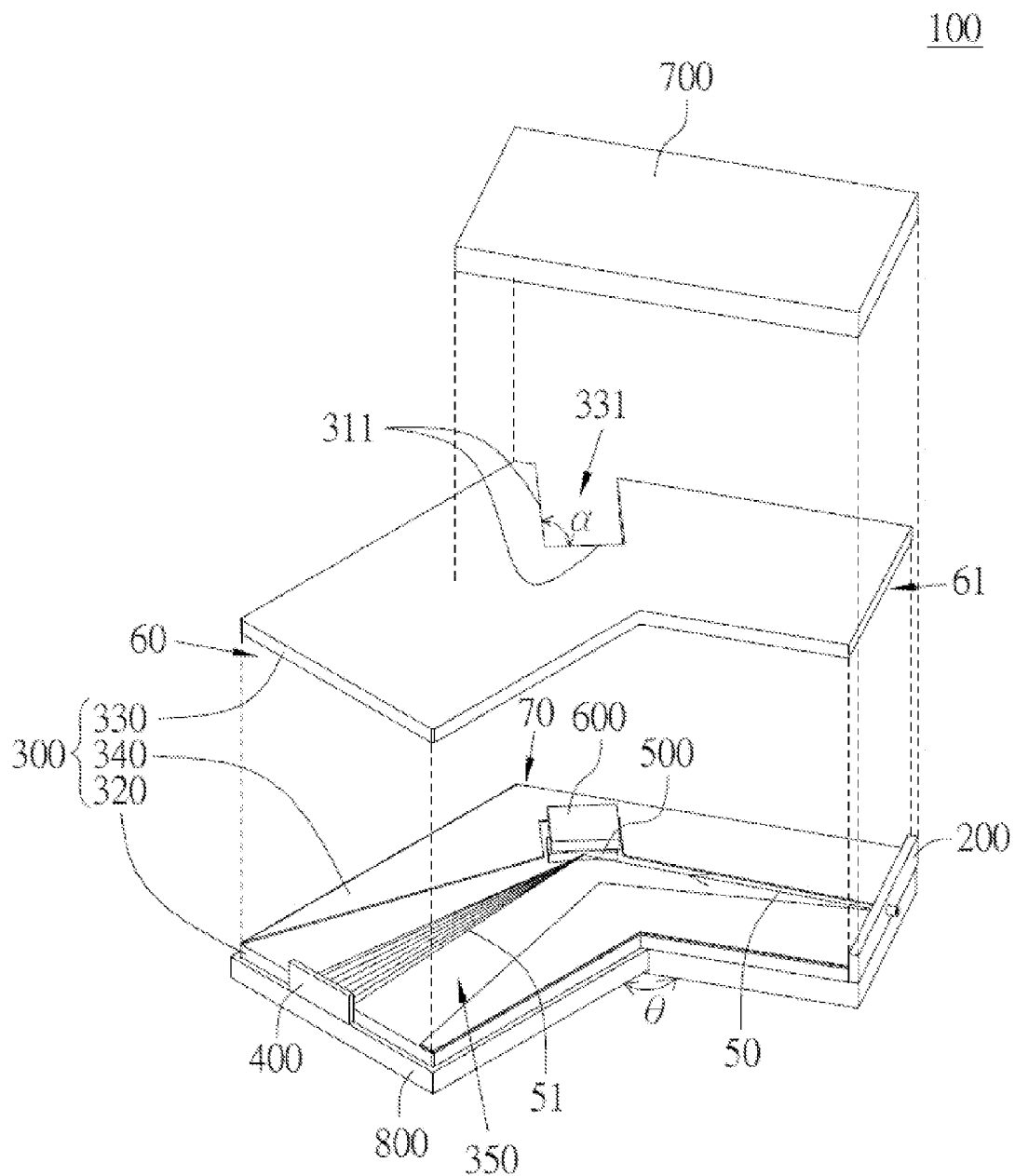
FIG. 1 is an exploded view of a miniature spectrometer in accordance with an embodiment.

50: optical signal
51: spectral components
60, 61: endpoints
70: turning point
100: miniature spectrometer
200: input unit
300: waveguide device
310: grating accommodation slot
311: positioning line
320: first waveguide plate
330: second waveguide plate
331: opening
340: side plate
350: cavity-type waveguide
400: image capture unit
500: miniature diffraction grating
600: cushion
700: affixing plate
800: protective plate
D1: first thickness
D2: second thickness
θ: turning angle
α: angle

DETAILED DESCRIPTION OF PREFERRED EMBODIMENTS

Detailed description of various embodiments is provided below. The disclosed embodiments are example illustrations, and do not limit the protective of the present invention. Additionally, non-critical components may be omitted in the drawings of the embodiments in order to clearly illustrate the technical characteristics of the present invention.

Figure 2:
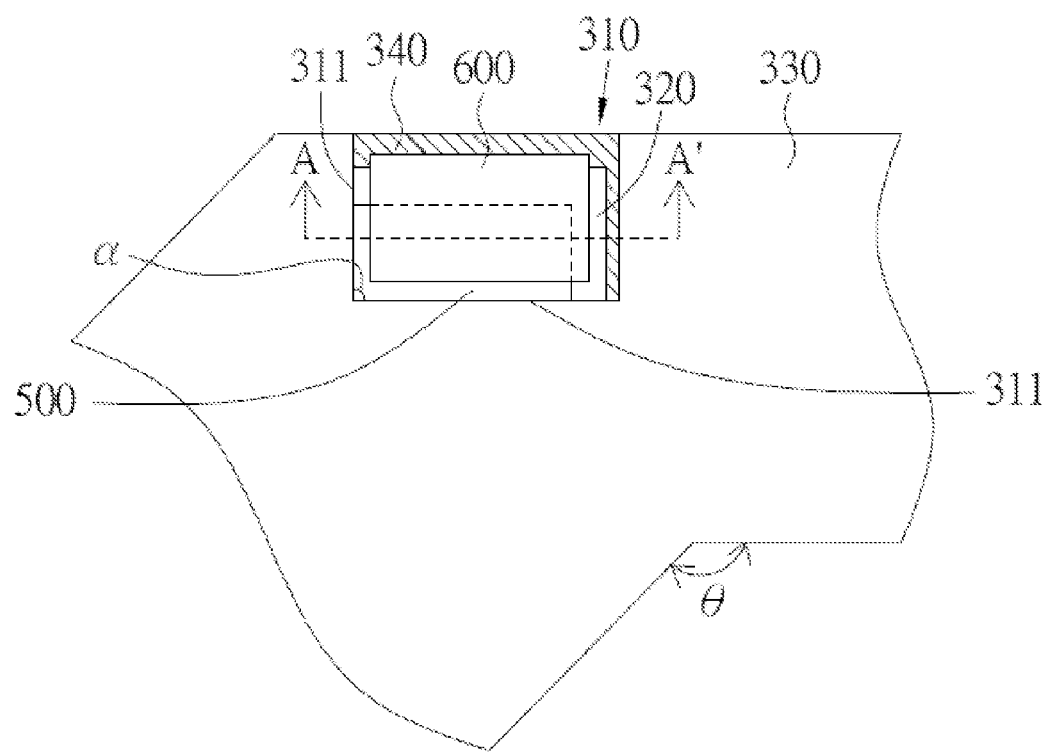
FIG. 2 is a top view of the miniature spectrometer of FIG. 1.
Figure 3:
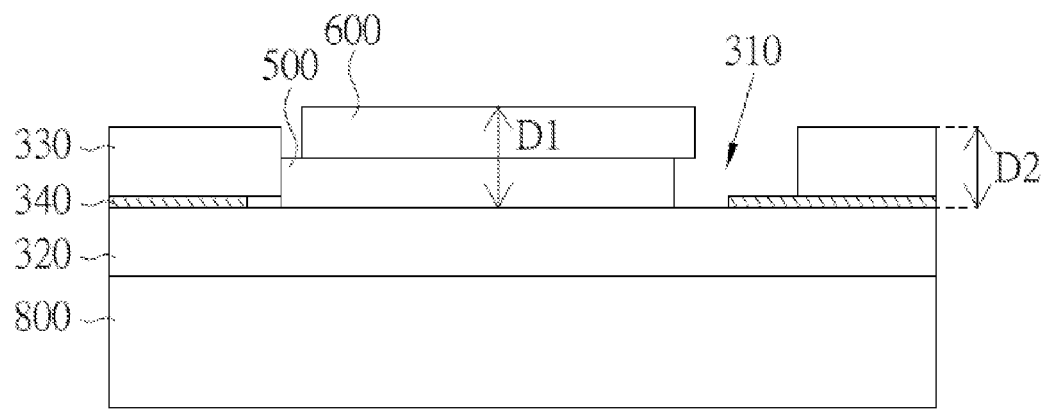
FIG. 3 is a cross-sectional view along line A-A' of FIG. 2.

The description below refers to FIGS. 1-3. FIG. 1 is an exploded view of a miniature spectrometer 100 in accordance with an embodiment. FIG. 2 is a top view of the miniature spectrometer 100 of FIG. 1. FIG. 3 is a cross-sectional view along line A-A' of FIG. 2.

The miniature spectrometer 100 comprises an input unit 200, an image capture unit 400, a miniature diffraction grating 500, a grating accommodation slot 310, a cushion 600 and an affixing plate 700. Preferably, the miniature spectrometer 100 further comprises a waveguide device 300.

In the miniature spectrometer 100 described above, the waveguide device 300 (as shown in FIG. 1) comprises a first waveguide plate 320, a second waveguide plate 330 and two side plates 340. More specifically, the second waveguide plate 300 includes an opening 331, and the grating accommodation slot 310 (as shown in FIG. 2) is defined by the opening 331 and a surface of the first waveguide plate 320. The two side plates 340 are disposed between the first waveguide plate 320 and the second waveguide plate 330 to form a waveguide 350 within which the optical signal 50 is transmitted. Regarding design choices, the waveguide 350 may be a cavity-type waveguide, for example, although the cavity may be filled with suitable substance (e.g., glass, plastic, acrylics, etc.). The opening 331 of the second waveguide plate 330 is located corresponding to the location where the cushion 600 is disposed. When the second waveguide plate 330 is disposed on the two side plates 340, the opening 331 exposes the cushion 600.

Preferably, as shown in FIG. 1, the miniature spectrometer 100 may further comprise a protective plate 800 that is disposed at an exterior of the first waveguide plate 320. In one embodiment, the protective plate 800 is disposed on a surface of the first waveguide plate 320, the surface opposite another surface of the first waveguide plate 320 on which the two side plates 340 are disposed. Without the protection of the protective plate 800, the first waveguide plate 320 is directly exposed to the ambience. This renders the first waveguide plate 320 vulnerable to defacing, percussion and collision and results in the degradation in performance of the miniature spectrometer 100 due to shifting of internal components of the miniature spectrometer 100 or reduction in the useful lifetime thereof. Further, the use of the affixing plate 700 can form a more comprehensive protection of the waveguide device 300. For example, the protective plate 800 and the affixing plate 700 may together form a space in which the waveguide device 300 is disposed, so that the waveguide device 300 is protected from defacing and collision from the outside.

In one embodiment, the grating accommodation slot 310 is disposed located at a space defined by the opening 331 of the waveguide device 300. In some embodiments, the grating accommodation slot may selectively be located on a chassis of the miniature spectrometer 100 (not shown), the protective plate 800, or elsewhere between the input unit 200 and the image capture unit 400 that is suitable for the miniature diffraction grating 500 to be placed. The input unit 200 is utilized to receive an optical signal 500. The waveguide device 300 is utilized to transmit the optical signal 50 therein. In one embodiment, the waveguide device 300 includes a grating accommodation slot 310 for receiving the miniature diffraction grating 500. In one embodiment, the grating accommodation slot 310 is a rectangular region and two adjacent edges of which form a positioning line 311 for the miniature diffraction grating 500 while the other two adjacent edges provide no particular function (to be described in detail below). The miniature diffraction grating 500 is utilized to separate the optical signal 50 transmitted in the waveguide device 300 into numerous spectral components 51 and cause the spectral components 51 to be projected onto the image capture unit 400. The cushion 600 is disposed above the miniature diffraction grating 500, and the cushion 600 together with the miniature diffraction grating 500 are disposed in the grating accommodation slot 310. In one embodiment, the affixing plate 700 is disposed on the waveguide device 300 and applies a compressive force on the cushion 600 to affix the miniature diffraction grating 500 in the grating accommodation slot 310. Regarding design choices, the affixing plate 700 may be locked on the chassis of the miniature spectrometer 100 (not shown), or the protective plate 800 may be expanded beyond the waveguide device 300 so that the affixing plate 700 may be locked on the protective plate 800 so long as a compressive force is applied on the cushion 600. Thus, the affixing plate 700 may be a part of the chassis of the miniature spectrometer 100 or may be substituted with a circuit board of the miniature spectrometer 100 (not shown) as it is not required to be an independent component and there is no particular limitation on the location thereof.

Moreover, in one embodiment, the image capture unit 400 of the miniature spectrometer 100 is disposed on the protective plate 800, and the image capture unit 400 comprises, for example, a charge-coupled device (CCD) or a complementary metal-oxide-semiconductor (CMOS). Furthermore, in one embodiment, the input unit 200 is disposed on the protective plate 800, for example.

In one embodiment, the waveguide device 300 of the miniature spectrometer 100 has a dart-type structure. In one embodiment the dart-type structure includes a turning point 70 from which two plate-like protrusions extend out and form an angle θ that is, for example, between 90 and 180 degrees. Additionally, distal edges of the two plate-like protrusions away from the turning point 70 comprise endpoints 60 and 61. In one embodiment, the input unit 200 is disposed at the endpoint 61, the image capture unit 400 is disposed at the endpoint 60, and the grating accommodation slot 310 is disposed at the turning point 70. In one embodiment, the structure of the protective plate 800 corresponds to the dart-type structure of the waveguide device 300, yet this by no means limits the spirit and scope of the present invention. The protective plate 800 may have, for example, a rectangular shape or other shapes. The size of the waveguide device 300 can be reduced appropriately so that it covers the path of the optical signal 50. The size of the protective plate 800 can be expanded beyond the scope of the waveguide device 300 conspicuously, and the grating accommodation slot 310 can be designed to be on the protective plate 800 near the turning point 70 such that the miniature diffraction grating can properly receive the optical signal 50 from the input unit 200 for spectrophotometry.

Next, detailed description of a relationship between the positions of the miniature diffraction grating 500 and the cushion 600 of the miniature spectrometer 100 is provided. In FIG. 2, the second waveguide plate 330 is disposed on the two side plates 340, although the affixing plate 700 is not shown therein. The miniature diffraction grating 500 is disposed on the first waveguide plate 320. In one embodiment, the miniature diffraction grating 500 is cut into a wafer having a substantially rectangular contour, and can be moved during assembly within the region provided by the grating accommodation slot 310 which is the rectangular region shown in FIG. 2. Two adjacent edges of the rectangular region of the grating accommodation slot 310 are defined by two adjacent edges of the opening 331 of the second waveguide plate 330. More specifically, two adjacent edges on the second waveguide plate 330 form the two adjacent edges of the opening 331. The other two adjacent edges of the rectangular region of the grating accommodation slot 310 are defined by the side plates 340 (these two adjacent edges play no specific role in terms of positioning, as described below). The cushion 600 is disposed above the miniature diffraction grating 500 and, in one embodiment, the cushion 600 is stacked over the miniature diffraction grating 500 with adhesive substance. In terms of design choices the stacking can be achieved without using adhesive substance. Operation of the cushion 600 may include, for example, exerting an external force to toggle the cushion 600 to move the miniature diffraction grating 500 forward. Thus, by exerting an external force on the cushion 600 to cause it to move toward the front left side of the opening 331 of the second waveguide plate 330 near the path of the optical signal 50 (which is the front left side of the grating accommodation slot 310), the miniature diffraction grating 500 also moves toward the front left side of the opening 331 of the second waveguide plate 330 (which is the front left side of the grating accommodation slot 310) until it touches the front left two adjacent edges of the opening 331 of the second waveguide plate 330. At such time the miniature diffraction grating 500 is up against the front left two adjacent edges of the opening 331 of the second waveguide plate 330 and thereby sets the position of the miniature diffraction grating 500. In terms of design the front left two adjacent edges of the rectangular region of the grating accommodation slot—which are the front left two adjacent edges of the opening 331 of the second waveguide plate 330—form an angle α to provide the positioning line 311 for proper positioning of the miniature diffraction grating 500 in the optical path(s) in the overall spectrometer. The location of the positioning line 311 is predetermined during the design of the entire spectrometer. When the miniature diffraction grating 500 abuts the positioning line 311, the miniature diffraction grating 500 is properly positioned in the predefined optical path(s) where grating should be. Through the operation of the cushion 600, the miniature diffraction grating 500 can be precisely positioned into the proper position. In one embodiment, the angle α is a rectangular angle. Of course, one option for positioning the miniature diffraction grating 500, which has a rectangular contour, is to use the grating accommodation slot 310, which has rectangular angle of the positioning line 311. Edges of triangular, non-rectangular quadrilateral, other multilateral, or other shape suitable for positioning (e.g., oval, particular curve, etc.) may be adopted for the positioning line 311 for the miniature diffraction grating 500 so long as the edges conform to the contour of the miniature diffraction grating 500. Alternatively, the contour of the miniature diffraction grating 500 may be divided into shape(s) accommodating the positioning line 311 of the grating accommodation slot 310. Although complexity and cost associated with fabrication may increase, alternatives are within the spirit of the present invention. From the above, it can be seen that the design of the cushion 600 and the grating accommodation slot 310 improves the convenience and precision of the positioning of the miniature diffraction grating 500.

Referring to FIG. 3 for further description, the thickness of the side plates 340 is less than the thickness of the miniature diffraction grating 500. As shown in FIG. 3, on the left side of the grating accommodation slot 310 the second waveguide plate 330 protrudes toward the right more than the side plate 340 and, thus, the position of the miniature diffraction grating 500 is set as the miniature diffraction grating 500 is up against the second waveguide plate 330. The location of the opening 331 on the second waveguide plate 330 is designed in accordance with the optical paths of the miniature spectrometer 100. As different optical paths correspondingly require different locations for the opening 331, the location of the opening 331 is designed to determine the location/position of the miniature diffraction grating 500.

Figure 4:
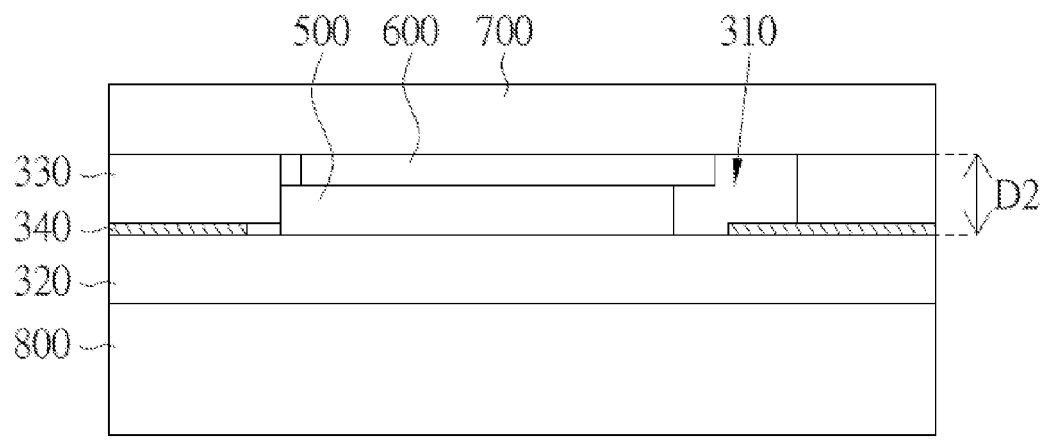
FIG. 4 is a cross-sectional view of the device of FIG. 3 with an affixing plate added thereto.

The description above pertains to how the position of the miniature diffraction grating 500 is determined and how the miniature diffraction grating 500 is precisely positioned. The following description refers to FIG. 3 and FIG. 4 for detailed description of how to affix the miniature diffraction grating 500 after the miniature diffraction grating 500 has been precisely positioned. FIG. 4 illustrates a cross-sectional view of the spectrometer of FIG. 3 with the affixing plate 700 added thereto. Referring to FIG. 3, a first thickness D1 is the sum of the thicknesses of the miniature diffraction grating 500 and cushion 600, and a second thickness D2 is the sum of the thicknesses of the side plate 340 and the second waveguide plate 330. In FIG. 3, the first thickness D1 is greater than the second thickness D2. In one embodiment, the cushion 600 is made of an elastic material such as, for example, silicone. Based on the elastic nature of the elastic material that restores itself back to its initial state after being compressed, the miniature diffraction grating 500 is thus affixed. Referring to FIG. 4, after the affixing plate 700 is disposed, the affixing plate 700 covers the cushion 600 and compresses the cushion 600 to reduce its thickness. After the affixing plate 700 is disposed, the combined thickness of the miniature diffraction grating 500 and the cushion 600 becomes the second thickness D2 (and the first thickness D1 is greater than the second thickness D2). As the compressed cushion 600 tries to restore to its original thickness it exerts a restoration force on the miniature diffraction grating 500 and the affixing plate 700. The miniature diffraction grating 500 is accordingly affixed in the grating accommodation slot 310 due to the restoration force of the cushion 600.

Furthermore, with the trend of miniaturization of the miniature spectrometer 100, fabrication of the miniature diffraction grating 500 becomes ever smaller and more precise. In order to conform with the trend of miniaturization, the miniature diffraction grating 500 may be manufactured using semiconductor technology. Accordingly, the material of the miniature diffraction grating 500 may be, for example, silicon, a III-V semiconductor material or a single-crystal material. Given the trend of manufacturing the miniature diffraction grating 500 using a semiconductor-related material, such as silicon, a III-V semiconductor material or a single-crystal material, the miniature diffraction grating 500 tends to be brittle under excessive external force. Thus, with the employment of the cushion 600 of an elastic material, not only the miniature diffraction grating 500 can be affixed but also there is no risk of damaging the miniature diffraction grating 500 due to excessive external force.

Figure 5:
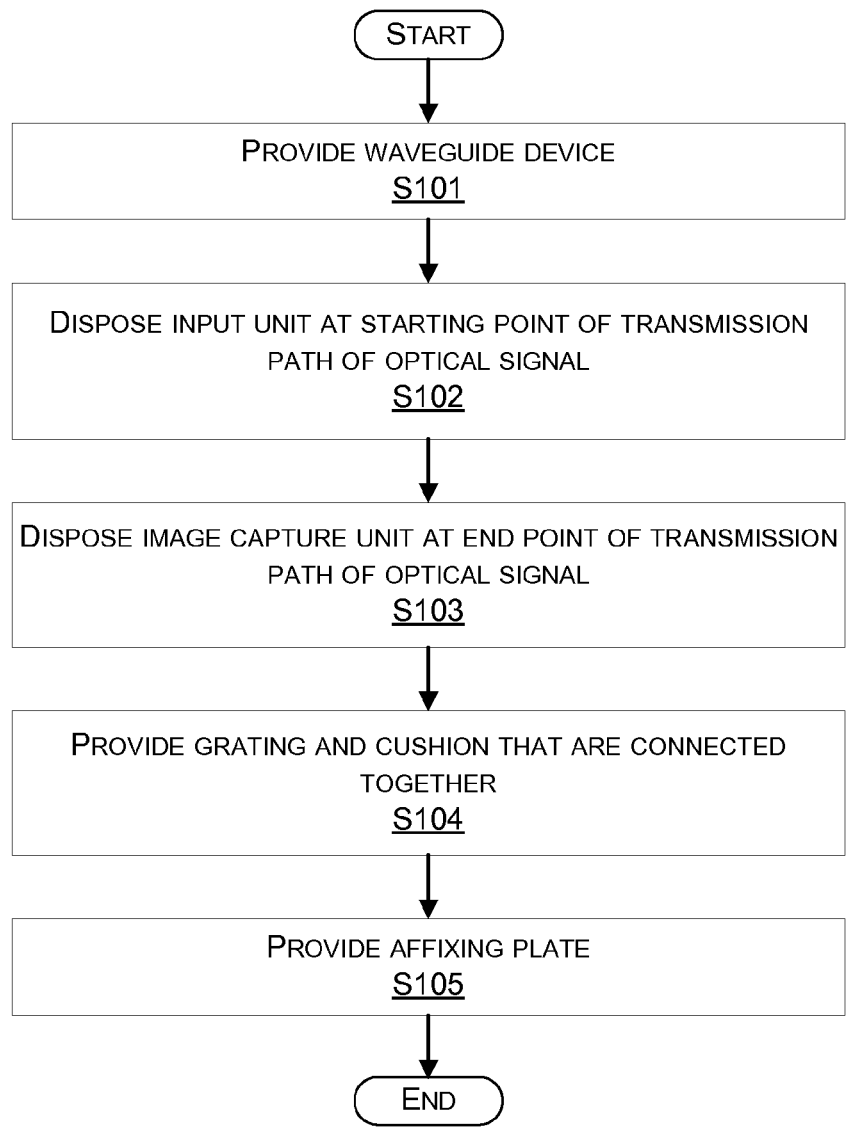
FIG. 5 is a flowchart of a method of assembling a miniature spectrometer.

On the other hand, the present invention also provides a method of assembly of the miniature spectrometer 100 with reference to FIG. 5. FIG. 5 illustrates a flowchart of a method of assembling the miniature spectrometer 100. The present embodiment, as shown in FIG. 1, pertains to the miniature spectrometer 100 having the waveguide device 300, in which the grating accommodation slot 310 is disposed in a space defined by the opening 331 on the waveguide device 300.

First, at step S101, a waveguide device 300 is provided. The waveguide device 300 allows an optical signal 50 to be transmitted therein, and is disposed in a grating accommodation slot 310. Then, at step S102, an input unit 200 is disposed at a starting point of the transmission path of the optical signal 50 to receive the optical signal 50. Afterwards, at step S103, an image capture unit 400 is disposed at an end point of the transmission path of the optical signal 50. Next, at step S104, a miniature diffraction grating 500 and a cushion 600 are provided. The cushion 600 is disposed above the miniature diffraction grating 500. By moving the cushion 600 the miniature diffraction grating 500 is positioned in the grating accommodation slot 310 and in the transmission path of the optical signal, so that the optical signal 50 in the waveguide device 300 is separated into numerous spectral components 51 that are projected onto the image capture unit 400. Subsequently, at step S105, an affixing plate 700 is provided. In one embodiment, the affixing plate 700 is disposed on the waveguide device 300 and covers the grating accommodation slot 310. The affixing plate 700 compresses the cushion 600 and cause the miniature diffraction grating 500 to be affixed in the grating accommodation slot 310. Among design choices, the affixing plate 700 may be locked on the chassis of the miniature spectrometer 100 (not shown), or a protective plate 800 may be expanded beyond the waveguide device 300 so that the affixing plate may be locked on the protective plate 800, so long as a compressive force is applied to the cushion 600. Therefore, the affixing plate 700 may be a part of the chassis of the miniature spectrometer 100 or may be substituted by a circuit board of the miniature spectrometer (not shown), as it is not required to be an independent component and there is no particular limitation on the location thereof.

Figure 6:
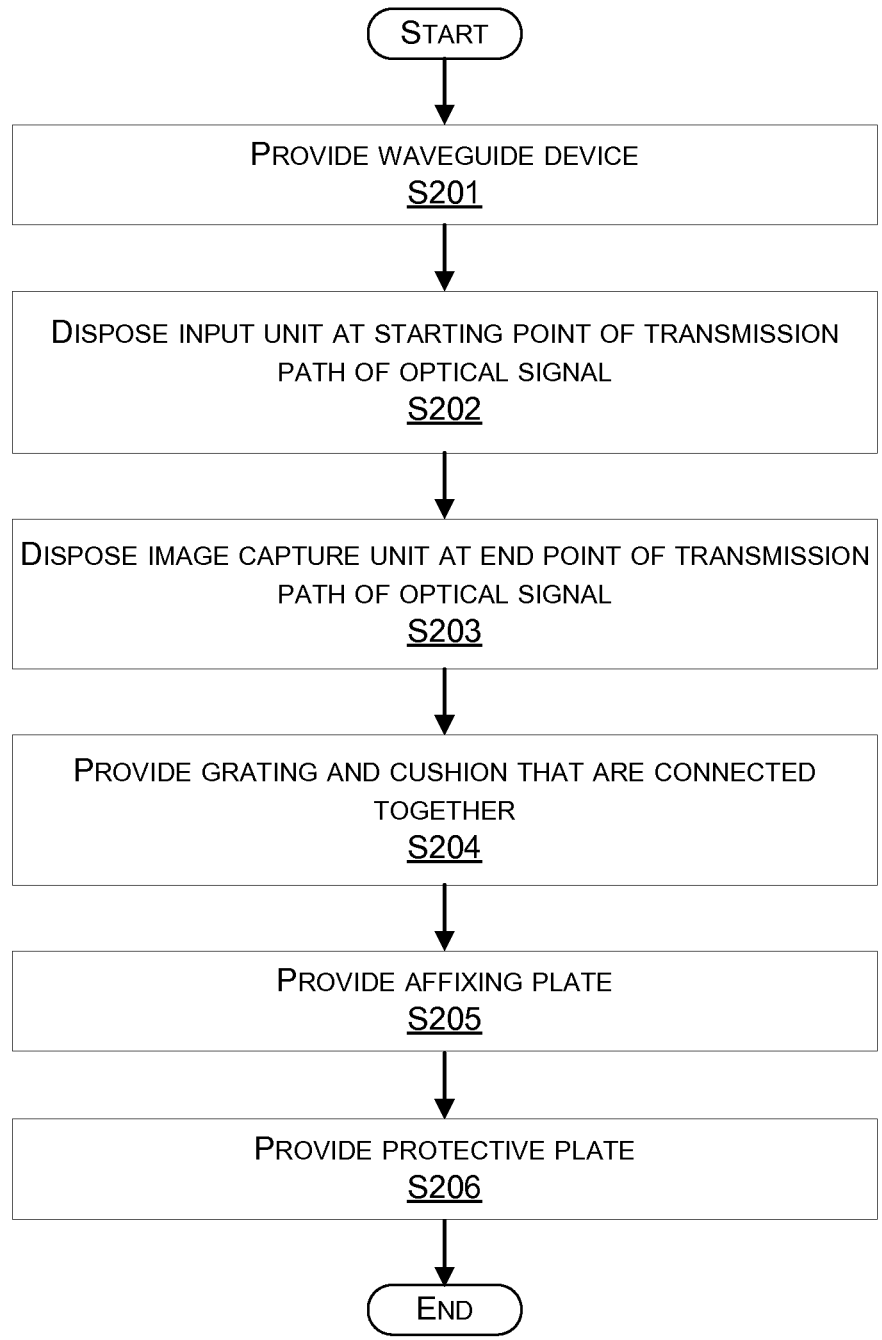
FIG. 6 is a flowchart of another method of assembling a miniature spectrometer.

Another method of assembling the miniature spectrometer 100 is shown in FIG. 6, which is a flowchart of a method of assembling a miniature spectrometer. In FIG. 6, steps S201-S205 are similar to steps S101-S105 of FIG. 5, and thus a description thereof will not be provided in the interest of brevity. At step S206, a protective plate 800 is disposed at an exterior of the waveguide device. In one embodiment, the protective plate 800 is disposed on a surface of the waveguide device 300, which corresponds to a surface of the affixing plate 700. The protective plate 800 protects the waveguide device 300 from defacing and collision from the outside.

The miniature spectrometer disposed according to various embodiments of the present invention utilizes a technique of disposing a cushion on the miniature diffraction grating to achieve precise positioning of the miniature diffraction grating and preventing the grating from being damaged due to excessive external force. As the miniature diffracting grating is a small component, movement or rotation thereof is not easy let alone precise positioning to a predefined position. Moreover, given the modernization of the miniaturization of spectrometers, spectrometers are ever smaller and the demand for precision of internal optical components is greatly increased. As the miniature diffraction grating is the most important component of a miniature spectrometer, any slight deviation in positioning or any damage thereof would reduce the precision and performance of the miniature spectrometer.

With respect to the movement and rotation of the grating, conventional technology only controls the grating itself. Miniaturization of the diffraction grating requires a higher precision of the positioning and movement of the grating device. In the embodiments of the present invention, a design of having a cushion disposed above the miniature diffraction grating is employed. By moving the cushion the miniature diffraction grating can be indirectly moved.

Further, the positioning of the miniature diffraction grating can be determined by defining the position of the grating device of the miniature spectrometer. Moreover, by covering the cushion with the affixing plate, the restoration force of the cushion helps affix the miniature diffraction grating in the grating accommodation slot. By employing a cushion of an elastic material, not only there is no risk of damaging the miniature diffraction grating due to excessive external force but also there is no risk of the miniature diffraction grating becoming loose due to insufficient external force. On the other hand, methods of assembling the miniature spectrometer as provided by the present invention are simple and do not require complicated procedure to assemble the miniature spectrometer.

Overall, embodiments of the present invention address issues associated with the difficulty in disposing a miniature diffraction grating in a miniature spectrometer, and further provide a technique that avoids damaging the miniature diffraction grating during the positioning thereof. Specifically, when brittle material such as semiconductor material is used, the disclosed technique is key to the precision and safety in assembly of the miniature diffraction grating. Moreover, methods of assembling the miniature spectrometer in accordance with embodiments of the present invention are simple and not complicated, thus enhancing the convenience and precision of the manufacturing of the miniature spectrometer.

From the foregoing it would be appreciated that, although specific embodiments of the present invention have been described for purpose of illustration, by no means they are to be interpreted as limiting the scope of the present invention. Various modifications may be made without departing from the spirit and scope of the present invention.

What is claimed is:

1. A miniature spectrometer, comprising:
an input port configured to receive an optical signal;
a waveguide device in which the optical signal is transmitted;
an image capture unit;
a miniature diffraction grating configured to separate the optical signal into a plurality of spectral components that are projected onto the image capture unit; and
a grating accommodation slot, provided by the waveguide device and disposed between the input port and the image capture unit, configured to receive the miniature diffraction grating;
a cushion disposed above the miniature diffraction grating such that the miniature diffraction grating and the cushion are disposed in the grating accommodation slot;
wherein the waveguide device comprises a first waveguide plate and a second waveguide plate, the second waveguide plate having an opening such that the grating accommodation slot is formed by the opening and a waveguide surface of the first waveguide plate, and wherein the miniature diffraction grating is disposed on the waveguide surface of the first waveguide plate and abutting two adjacent edges of the opening of the second waveguide plate.

2. The miniature spectrometer of claim 1, wherein the grating accommodation slot comprises a positioning line that forms a predefined shape corresponding to a contour of the miniature diffraction grating such that the miniature diffraction grating is assembled in position according to the positioning line.

3. The miniature spectrometer of claim 2, wherein the contour of the miniature diffraction grating is a quadrilateral, wherein the positioning line forms an angle, and wherein the miniature diffraction grating is assembled in position with two adjacent edges of the quadrilateral abutting the angle.

4. The miniature spectrometer of claim 1, further comprising:
  a waveguide device in which the optical signal is transmitted; and
  an affixing plate configured to apply a compressing force on the cushion to affix the miniature diffraction grating in the grating accommodation slot.

5. The miniature spectrometer of claim 4, wherein a material of the cushion comprises silicone.

6. The miniature spectrometer of claim 4, wherein a material of the cushion comprises an elastic material.

7. The miniature spectrometer of claim 4, wherein the affixing plate is a part of a chassis of the miniature spectrometer.

8. The miniature spectrometer of claim 4, wherein the affixing plate is a circuit board of the miniature spectrometer.

9. The miniature spectrometer of claim 1, wherein
  two side plates disposed between the first and the second waveguide plates to form a waveguide in which the optical signal is transmitted.

10. The miniature spectrometer of claim 9, wherein a sum of a thickness of the cushion and a thickness of the miniature diffraction grating is a first thickness, wherein a sum of a thickness of one of the two side plates and a thickness of the second waveguide plate is a second thickness, and wherein the first thickness is greater than the second thickness.

11. The miniature spectrometer of claim 10, wherein the grating accommodation slot comprises a positioning line that forms a predefined shape corresponding to a contour of the miniature diffraction grating such that the miniature diffraction grating is assembled in position according to the positioning line.

12. The miniature spectrometer of claim 11, wherein the contour of the miniature diffraction grating is a quadrilateral, wherein the positioning line forms an angle, and wherein the miniature diffraction grating is assembled in position with two adjacent edges of the quadrilateral abutting the angle.

13. The miniature spectrometer of claim 9, further comprising:
  a protective plate disposed at an exterior of the waveguide device.

14. The miniature spectrometer of claim 13, wherein the protective plate is disposed on a surface opposite another surface of the first waveguide plate on which the two side plates are disposed.

15. The miniature spectrometer of claim 1, wherein the waveguide device includes a turning point where the grating accommodation slot is disposed.

16. The miniature spectrometer of claim 1, wherein a material of the miniature diffraction grating comprises silicon, a III-V semiconductor material, or a single-crystal material.

17. A method of assembling a miniature spectrometer, comprising:
  providing a waveguide device in which an optical signal is transmitted, wherein the waveguide device comprises a first waveguide plate and a second waveguide plate, the second waveguide plate having an opening such that a grating accommodation slot is formed by the opening and a waveguide surface of the first waveguide plate;
  disposing an input port at a starting point of a transmission path of the optical signal so that the input port receives the optical signal;
  disposing an image capture unit at an end point of the transmission path of the optical signal; and
  providing a miniature diffraction grating on the waveguide surface of the first waveguide plate,
  providing a cushion above the miniature diffraction grating such that the miniature diffraction grating and the cushion are disposed in the grating accommodation slot;
  wherein the miniature diffraction grating abuts two adjacent edges of the opening of the second waveguide plate such that the miniature diffraction grating is in the transmission path to separate the optical signal into a plurality of spectral components that are projected onto the image capture unit.

18. The method of assembling the miniature spectrometer of claim 17, further comprising:
  providing an affixing plate that is disposed on the waveguide device to cover the grating accommodation slot, the affixing plate compressing on the cushion such that the miniature diffraction grating is affixed in the grating accommodation slot; and
  disposing a protective plate at an exterior of the waveguide device.

19. The method of assembling the miniature spectrometer of claim 17, wherein a material of the cushion comprises an elastic material.

20. The method of assembling the miniature spectrometer of claim 17, further comprising:
  positioning the miniature diffraction grating to a predefined position by moving the cushion.

* * * * *